United States Patent [19]

Van Brimer et al.

[11] Patent Number: 4,853,706

[45] Date of Patent: Aug. 1, 1989

[54] TRANSPARENCY WITH JETTED COLOR INK AND METHOD OF MAKING SAME

[76] Inventors: R. Hugh Van Brimer, 287 N. Poverty Rd., Southbury, Conn. 06488; Donald Allred, 25 Laurel Dr., Brookfield, Conn. 06804; Theodore M. Cooke, 25 Washington St., Danbury, Conn. 06810; An C. R. Lin, 1 Patricia La., Newtown, Conn. 06470; Julia E. Rubbo, 585 Park Rd., Bldg. 10, Unit 6, Waterbury, Conn. 06708

[21] Appl. No.: 97,945

[22] Filed: Sep. 17, 1987

[51] Int. Cl.[4] .............................................. G01D 15/16

[52] U.S. Cl. ........................................ 346/1.1; 346/25; 346/135.1; 346/140 R

[58] Field of Search ............... 346/1.1, 75, 140, 135.1, 346/25

[56] References Cited

U.S. PATENT DOCUMENTS

| | | | |
|---|---|---|---|
| 4,095,234 | 6/1978 | Mito | 346/75 |
| 4,308,542 | 12/1981 | Maekawa | 346/1.1 |
| 4,503,111 | 3/1985 | Jaeger | 346/1.1 X |
| 4,568,951 | 2/1986 | Hasegawa | 346/76 PH |
| 4,595,931 | 6/1986 | Toganoh | 346/1.1 |
| 4,666,757 | 5/1987 | Helinski | 346/135.1 X |
| 4,741,930 | 5/1988 | Howard | 346/1.1 X |
| 4,745,420 | 5/1988 | Gerstenmaier | 346/140 |

*Primary Examiner*—Joseph W. Hartary
*Attorney, Agent, or Firm*—Woodcock Washburn Kurtz Mackiewicz & Norris

[57] ABSTRACT

A method of making a color transparency with jetted color ink jet apparatus includes the steps of heating hot melt ink including an ink vehicle and a substantially translucent dye to a temperature above the melting point to attain the liquid state, ejecting small volumes of the hot melt ink from the ink jet apparatus toward a substantially transparent resinous support, cooling the small volumes of ink on the support so as to attain the solid state, and flattening the small volumes on the support to produce a substantially planar surface which minimizes refraction and scattering of light projected thereon or therethrough.

16 Claims, 2 Drawing Sheets

TRANSPARENCY WITH JETTED COLOR INK AND METHOD OF MAKING SAME

BACKGROUND OF THE INVENTION

This invention relates to the use of an ink jet apparatus to apply color hot melt ink on a transparency.

Efforts have been made to employ an ink jet for recording a transparency and, in some instances, color inks have been used. See, for example, U.S. Pat. Nos. 3,889,270, 4,474,850 and 4,528,242. Typically, special materials must be utilized in the transparency support so as to permit the ink to be permanent and smear resistant. However, it has been found that hot melt ink will adhere readily to any surface including a transparency comprising a resinous support.

Color transparencies made from jetting hot melt color ink do, however, present a serious light scattering problem. As the hot melt solidifies on the support after contact, the volume of ink formed on the support is substantially hemispherical. This, in turn, results in refraction and scattering of the light as it strikes and penetrates the surface of the ink at different angles as a result of reflection and refraction.

SUMMARY OF THE INVENTION

It is an object of this invention to utilize hot melt ink so as to achieve a permanent, smear resistant transparency.

It is a further object of this invention to employ color hot melt ink in a transparency without, or at the very least minimizing light scattering.

It is yet a further object of the present invention to control the refraction and scattering of light, or lens effect, in transparencies to provide enhanced color images thereon.

In accordance with these and other objects of the invention, a process for creating a color transparency using an ink jet apparatus comprises the steps of heating hot melt ink including an ink vehicle and a substantially translucent dye to a temperature above the melting point to attain the liquid state. Small volumes of hot melt ink are then ejected from the ink jet apparatus toward a substantially transparent resinous support. Small volumes of ink on the support are then cooled so as to attain the solid state. The support and the small volumes are then subjected to pressure and/or heat so as to spread and flatten the small volumes on the support. Such spreading and flattening may be accomplished merely by again heating the support and small volumes to a temperature above the melting point of the ink, followed by a cooling of the support and small volumes so as to solidify the small volumes on the support in a spread and flattened condition.

In accordance with one important aspect of the invention, the support has a surface energy in excess of twenty-five (25) dynes per centimeter (dynes/cm). Preferably, the surface energy of the support is higher than the surface tension of the ink.

In accordance with another important aspect of the invention, the ink is at least partially translucent and comprises an at least partially translucent dye. In the preferred embodiment, the support comprises an acrylic or an acrylate.

In accordance with the preferred embodiment of the invention, the support and the small volumes of the ink on the support are heated for about 30 seconds to about 5 minutes at a temperature in excess of 70° C. to achieve the spreading and flattening of the volumes. As a result of the foregoing method, a transparency is achieved where a plurality of volumes of hot melt ink are characterized by a substantially planar surface outwardly from said support. The substantially planar surface outwardly from said support is at least 20% of the area of the support covered by the area of each of the volumes, preferably 50%, and even more preferably 75%. The thickness of the volumes as measured from the substantially planar surface outwardly from said support to the support varies by less than 25% and preferably less than 10%.

In accordance with another embodiment of the present invention, after having ejected the small volumes of ink upon the support, a second substantially transparent resinous support having a thin film of hot melt adhesive applied thereon is placed over the support and the small volumes of ink, and thereafter heated to spread and flatten the volumes. The resulting laminate further protects the transparency from cracking, peeling, or mishandling.

In accordance with yet another embodiment of the present invention, the support and small volumes may be protected by a transparent coating which minimizes the amount of light reflected and refracted by, and scattered from the air/ink interface, and which is capable of displacing air from around the small volumes to form a durable protective coating over the transparency. Such transparent coatings may be formulated for brush or other contact applications, or for aerosol application.

DETAILED DESCRIPTION OF A PREFERRED EMBODIMENT

Figure 1A:
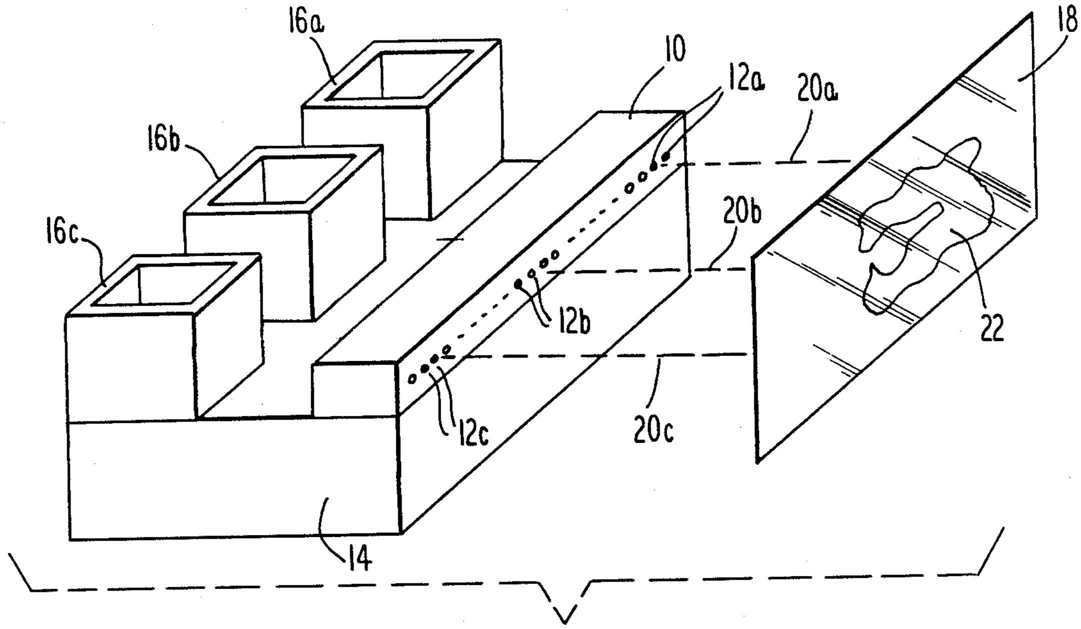
FIG. 1A is a perspective view of apparatus utilized in practicing several steps of the invention.
Figure 1B:
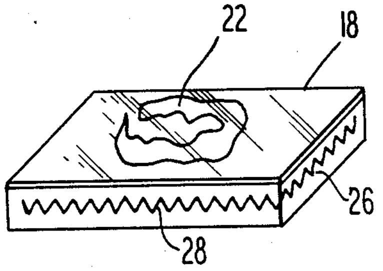
FIG. 1B is a perspective view of apparatus utilized in practicing another step of the invention.

Referring to FIG. 1A, an ink jet apparatus is shown for ejecting small volumes (droplets or ligaments) of a hot melt or phase change ink. The apparatus comprises a head 10 including a plurality of ink jets having orifices 12(*a–c*) where the orifices 12*a* eject small volumes of one color, the orifices 12*b* eject small volumes of another color, and the orifices 12*c* eject small volumes of yet another color. The head 10 is mounted on a base 14 which includes a heater for establishing and maintaining solid state ink in a liquid state within the reservoirs which supply the head 10. Receptacles 16(*a–c*) receive solid state ink of different colors. The solid state ink is then subsequently melted down within the reservoirs of the base 14.

After the hot melt ink of various colors has been heated to the melting point, the various colors of hot melt ink are ejected in small volumes toward a target transparency 18 along paths 20(*a*–*c*). It will be appreciated that the target transparency 18 is scanned relative to the head 10 so as to allow the various volumes of the various colors to be laid down in side-by-side or superimposed relationship upon the transparency 18 to achieve the desired information pattern 22.

Figure 4:
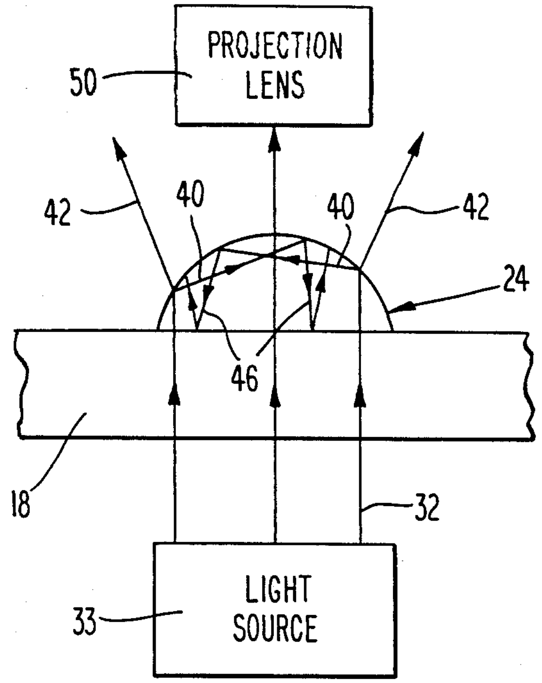
FIG. 4 is a sectional view of the transparency utilizing hot melt ink without practicing the invention.

The transparency 18 comprises a substantially transparent, resinous support. Upon contacting the resinous support of the transparency 18, the small volumes of ink are cooled so as to return the ink to the solid state. At this point in time, each small volume of ink 24 within the information pattern 22 appears as shown in FIG. 4. More particularly, each volume of ink 24 is characterized by a substantially hemispherical shape.

In accordance with this invention, the transparency 18 with the image pattern 22 is now juxtaposed to a heater 26 which may, for example, comprise a hot plate including a resistive heating element 28. The transparency 18 may be brought into close thermocoupling or contact with the heater 26 so as to remelt the solid state ink in the image pattern 22. For example, the transparency 18 may be heated for about 30 seconds to about 5 minutes at a temperature of 70°–140° C. (depending upon the time of heating) with the transparency 18 in contact with the heater 26. At the conclusion of such a period of heating, the transparency is allowed to cool in ambient temperature as depicted by FIG. 1C.

Figure 1C:
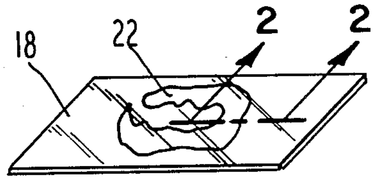
FIG. 1C is a perspective view of the transparency being produced during the last step of the process.
Figure 2:
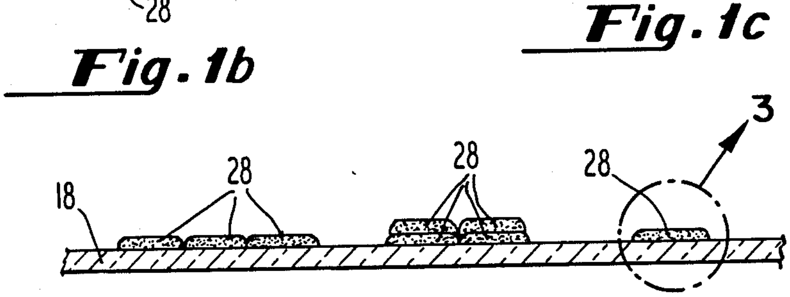
FIG. 2 is a sectional view of the transparency of FIG. 1C taken along line 2—2.
Figure 3:
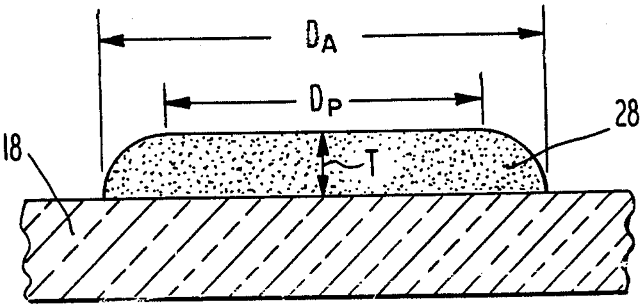
FIG. 3 is an enlarged view of a portion of the transparency shown in FIG. 2.
Figure 5:
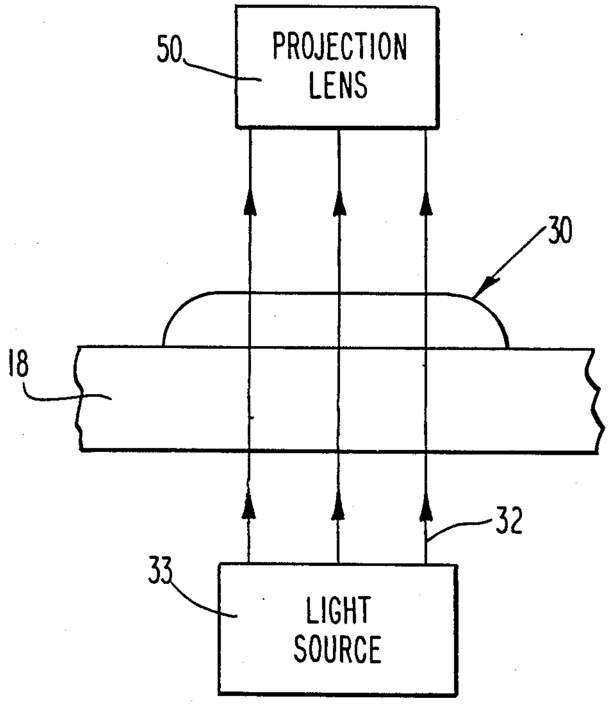
FIG. 5 is a sectional view of a transparency made by practicing the invention.

In accordance with this invention, the volumes of ink within the pattern 22 of FIG. 1C are flattened as shown in FIG. 5. Particularly, the reheated and cooled volumes 28 are now characterized by a flattened surface outwardly from said support as depicted in FIGS. 2 and 3. Referring to FIG. 3, it will be seen that the central area within the volume 28 having a diameter $D_P$ (the P indicating planar) is substantial when compared with the overall area of the volume 28 which covers the transparency 18 having a diameter $D_A$ (the A indicating area). Preferably, the area characterized by the diameter $D_P$ is equal to at least 20%, preferably 50%, and even more preferably at least 75% of the area corresponding with the diameter $D_A$. It will, of course, be appreciated that each of the volumes 28 is not strictly circular and the use of the word diameter is not intended to so indicate. It will also be appreciated that the flattened surface characterized by the diameter $D_P$ is not strictly planar. It is, however, sufficiently planar such that the thickness T of each of the volumes 28 varies by less than 25% and preferably 10%.

Referring now to FIGS. 4 and 5, the effect of a flattened surface 30 on the volume 28 (FIG. 5) will be discussed in terms of reflection and refraction of light in addition to scattering vis-a-vis the hemispherical volume 24 as shown in FIG. 4. More particularly, it will be seen that without the teachings of the present invention rays of light 32 from a source 33, such as a conventional overhead projector, will strike the underside of the hemispherical surface 24, and are either reflected or refracted by the surface 24 along respective paths 40 and 42, or pass substantially unaffected through the surface 24 towards a projection lens system 50. The rays reflected by the surface 24 along the paths 40 are then reflected by the transparency 18 along paths 46 towards the surface 24 where they are subjected once again to the effects of reflection and refraction. As can be readily seen from the above description of FIG. 4, the hemispherical surface 24 has a "lens effect" which can cause substantial reflection, refraction and ultimate scattering of the rays 32 from the source 33, thereby leading to poor color definition when used with transparencies.

Referring now to FIG. 5, however, it can also be seen that the same rays 32 of light from the source 33 when projected upon the flattened surface 30 pass substantially unaffected through the surface 30 onto the projection lens system 50. The flattened surface 30 thus negates the lens effect referred to herein above with respect to the hemispherical surface 24, thereby minimizing refraction and scattering of light and promoting an enhanced color image upon the transparency 18. It should, therefore, be appreciated that refraction and scattering of the light is minimized using the flat volumes 28 as depicted in FIG. 5 as compared with the hemispherical volumes 24 as depicted in FIG. 4.

The ink which is utilized may be of the type described in U.S. Pat. Nos. 4,484,948 and 4,390,369 which are assigned to the assignee of this invention and incorporated herein by reference. Inks of this type will incorporate an at least partially translucent dye as set forth in the following examples:

| | (weight percent) | | |
|---|---|---|---|
| Candelilla | 67 | 67 | 68 |
| Hydrofol 2285 | 30 | 30 | 30 |
| Astra Blue | — | 3 | — |
| Neptune Red | 3 | — | 2 |
| Tricon Yellow | — | — | 2 |

As stated previously, the substantially, transparent resinous support may comprise an acrylic, acrylate or ester. Specific examples of such supports are as follows. Type X-2417 transparencies manufactured by Minnesota Mining & Manufacturing Co., vinyl acetate, and Mylar (a registered trademark of DuPont).

In order to achieve the proper spreading and flattening of the volumes of ink, the transparency resinous support should have a sufficiently high surface energy, i.e., 25 dynes/cm. Preferably, the surface energy is in excess of 28 dynes/cm with a surface energy of 30 dynes/cm preferred. At the same time, the surface energy of the support should be higher than the surface tension of the ink. In this connection, the surface tension of the ink should be less than 40 dynes/cm, and preferably less than 30 dynes/cm.

A method and apparatus for jetting hot melt ink is described in copending application Ser. No. 610,627, filed May 16, 1984, which is assigned to the assignee of this invention and incorporated herein by reference. Further details concerning the apparatus are disclosed in U.S. Pat. No. 4,459,601 which is assigned to the assignee of this invention and incorporated herein by reference. Further details concerning the nature of the jets may be also found in copending application Ser. No. 661,794, filed Oct. 16, 1984, which is assigned to the assignee of this invention and incorporated herein by reference.

Referring to FIG. 2, it will be seen that the volumes 28 are located in side-by-side relationship and also, in some instances, superimposed. Where the volumes are located side-by-side, a so-called process color is achieved by a subtractive process. That is, melt ink which is characterized by a solid state at room temperature is supplied to the reservoirs of the base 14 from the receptacles 16. Ink is maintained in the liquid state in the reservoir of the base 14 by heating the reservoirs of the base 14 to a temperature above room temperatures.

Different colors of liquid ink in the liquid state are then supplied to each of the reservoirs for each of the ink jets. Small volumes of the liquid of different colors are selectively ejected in the liquid state to achieve various color combinations. The small volumes which are ejected are then deposited on the target within close proximity. The ink is cooled and solidified on, with limited mixing of the volumes, to achieve various color effects for the human eye in the selected areas.

In order to achieve various shades of color, the volumes of ink may be modulated in size such that the volume of ink of one color which is deposited on the target is of a different size than the volume of ink of another color which is deposited on the target. In the same manner, the spacing and density of the volumes of ink deposited on the target ma be varied to also affect color shading.

The small volumes 28 of ink may also be superimposed on the target. In accordance therewith, the depositing of one small volume of ink on top of another small volume of ink produces little mixing because of the prompt solidification of the ink. The actual mixing of the two different colors of ink is substantially limited to the interface between the volumes of ink. The resulting color shade is a function of the color and quantity of ink in one of the volumes as compared with the color and quantity of ink in another of the volumes. A color shading may also be achieved by modulating the quantity of ink and the small volumes of superimposed ink. In other words, the quantity of ink and the small volumes may be varied relative to the quantity of ink in the other small volume to achieve various color shades.

One means of spreading and flattening the small volumes 28 of ink, and further of providing a protective coating for the transparency 18 in accordance with another embodiment of the present invention is to laminate a second substantially transparent resinous support over the transparency 18 having the image pattern 22 printed thereon. Such lamination may be suitably accomplished by applying a hot melt adhesive, such as but not limited to ethylene acrylic acid copolymer resin, or polyamide resins, or ethylene vinyl acetate resin, or polybutene resins, to the surface of the second support 18, applying the adhesive-covered second support 18 to cover the transparency 18 having the printed image pattern 22, and thereafter applying heat to melt the adhesive and image pattern 22 in a similar manner a described herein above with reference to FIGS. **1*b* and 1*c*. The hot melt adhesive chosen should be easily applied in any well known manner, and optically clear so that it will spread around the volumes 28 of ink comprising the image pattern 22 while at the same time will not degrade color brilliance of the image pattern 22** by refracting or scattering.

Yet another method of protecting the transparency 18 in accordance with another embodiment of the present invention is to apply a selected transparent coating over the transparency 18 having the image pattern 22 printed thereon. Such a transparent coating is selected to minimize the refraction and scattering of light at the air/ink interface, by minimizing the difference ($\Delta n$) between the indices of refraction of the ink and the transparent coating. That is, since typical hot melt inks exhibit an index of refraction of about 1.44, a transparent coating having an index of refraction of from about 1.33 to about 1.70 has been found to minimize refraction and scattering of light. Therefore, the preferred $\Delta n$ is from about $-0.11$ to about $+0.26$. Such transparent coatings may be formulated for brush or other contact applications, or for aerosol application. One exemplary transparent coating suitable for aerosol application is comprised of the following ingredients by weight percent:

| | |
|---|---|
| Nitrocellulose | 13.4 |
| Ethyl cellulose | 3.4 |
| Dibutyl sebacate | 6.6 |
| MIBK | 6.6 |
| Acetone | 40.2 |
| Ethanol | 16.6 |
| MEK | 6.6 |
| Amyl Acetate | 6.6 |
| | 100.0 |

Two other exemplary transparent coatings, suitable for application by brushing or wiping, are comprised as follows:

| | |
|---|---|
| Nitrocellulose | 20.0 |
| Ethyl cellulose | 5.0 |
| Dibutyl sebacate | 10.0 |
| MIBK | 10.0 |
| Acetone | 10.0 |
| Ethanol | 25.0 |
| MEK | 10.0 |
| Amyl acetate | 10.0 |
| | 100.0 |

| | |
|---|---|
| Polyurethane aqueous dispersion | 50.0 |
| Water | 18.0 |
| Fluorosurfactant | 2.0 |
| Ethanol | 30.0 |
| | 100.0 |

Any one of the above-described transparent coatings is applied to the transparency 18 after application of pressure/heat, and allowed to air dry.

Athough particular embodiments of the invention have been shown and described and various modifications suggested, it will be appreciated that other embodiments and modifications will occur to those of ordinary skill in the art which will fall within the true and spirit and scope of the invention.

We claim:

1. A process for creating a color transparency using an ink jet apparatus comprising the following steps:

heating hot melt ink comprising an ink vehicle and a substantially translucent dye to a temperature above the melting point of said hot melt ink;

ejecting small volumes of said hot melt ink from the ink jet apparatus toward a substantially transparent support, each said volume including a first substantially planar surface at its interface with said support, and a second surface opposed to said first surface extending outwardly from said support;

cooling the small volumes to the solid state on the support;

spreading and flattening said second surface of each of the small volumes on the support including the step of heating the support and the small volumes; and cooling the support and the small volumes so as to solidify the small volumes in a spread and flattened condition on the support.

2. The process of claim 1 wherein said support is characterized by a surface energy in excess of 25 dynes/cm.

3. The process of claim 1 wherein said support has a surface energy higher than the surface tension of the ink.

4. The process of claim 1 wherein the ink is at least partially translucent.

5. The process of claim 1 wherein the ink comprises an at least partially translucent dye.

6. The process of claim 1 wherein the support comprises an acrylic.

7. The process of claim 1 wherein the support comprises an acrylate.

8. The process of claims 1, 6 or 7 wherein the support and the small volumes are heated from about 30 seconds to about 5 minutes at a temperature in excess of 70° C.

9. The process of claim 1, further comprising the step of applying a protective coating to said support and small volumes.

10. The process of claim 9, wherein said application step comprises the steps of:
providing another support;
applying a hot melt adhesive to a surface of said other support; and
laminating said other support to said support and the small volumes prior to said heating step.

11. The process of claim 10, wherein said hot melt adhesive comprises a resin selected from the group consisting of ethylene acrylic acid copolymer resin, polyamide resins, ethylene vinyl acetate resin, and polybutene resins.

12. The process according to claim 9, wherein said application step comprises the steps of:
selecting a transparent coating having a predetermined index of refraction;
applying said transparent coating to said cooled support and the small volumes; and
drying said transparent coating.

13. The process according to claim 12, wherein said predetermined index of refraction comprises a range of from about 1.33 to about 1.70.

14. The process according to claim 12, wherein said application step comprises brushing said transparent coating upon said support and the small volumes.

15. The process according to claim 12, wherein said application step comprises spraying said transparent coating upon said support and the small volumes by aerosol means.

16. A process for creating a color transparency using an ink jet apparatus comprising the following steps:
heating hot melt ink comprising an ink vehicle and a substantially translucent dye to a temperature above the melting point of said ink in liquid form;
ejecting small volumes of hot melt ink from the ink jet apparatus toward a substantially transparent support, each said volume including a first substantially planar surface at its interface with said support, and a second surface opposed to said first surface extending outwardly from said support;
cooling the small volumes to the solid state on the support; and
flattening a major portion of said second surface of each said small volumes upon said support, wherein said flattening step comprises the steps of:
heating the support and the small volumes so as to spread and flatten the small volumes on the support; and
cooling the support and the small volumes so as to solidify the small volumes in a spread and flattened condition on the support.

* * * * *

UNITED STATES PATENT AND TRADEMARK OFFICE

CERTIFICATE OF CORRECTION

PATENT NO. : 4,853,706

DATED : August 1, 1989

INVENTOR(S) : VanBrimer et al.

It is certified that error appears in the above-identified patent and that said Letters Patent is hereby corrected as shown below:

In the "Abstract", title page, lines 1 and 2, change "jetted color" to --an--.

Column 5, line 16, change "ma" to --may--.

Signed and Sealed this

Eighth Day of January, 199

Attest:

HARRY F. MANBECK, JR.

*Attesting Officer*

*Commissioner of Patents and Trademarks*